(12) United States Patent
Oyamada

(10) Patent No.: US 11,471,988 B2
(45) Date of Patent: Oct. 18, 2022

(54) GRIPPING DEVICE AND SYSTEM

(71) Applicant: FANUC CORPORATION, Yamanashi (JP)

(72) Inventor: Tomohiro Oyamada, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 262 days.

(21) Appl. No.: 16/685,005

(22) Filed: Nov. 15, 2019

(65) Prior Publication Data

US 2020/0156197 A1   May 21, 2020

(30) Foreign Application Priority Data

Nov. 19, 2018   (JP) .............................. JP2018-216337

(51) Int. Cl.
  *B23Q 3/157*   (2006.01)
  *B23Q 3/155*   (2006.01)
  *B23Q 3/18*    (2006.01)

(52) U.S. Cl.
  CPC ...... *B23Q 3/15534* (2016.11); *B23Q 3/15553* (2013.01); *B23Q 3/186* (2013.01); *B23Q 3/15526* (2013.01); *B23Q 3/15722* (2016.11); *B23Q 2003/15527* (2016.11); *Y10S 483/902* (2013.01); *Y10T 483/136* (2015.01); *Y10T 483/1795* (2015.01); *Y10T 483/1809* (2015.01)

(58) Field of Classification Search
  CPC ......... Y10T 483/1809; Y10T 483/1882; Y10T 483/1891; Y10T 483/902; B23Q 3/15722; B23Q 2003/15527; B23Q 2003/15586; B23Q 3/15553

USPC ....................................... 483/59, 67, 68, 902
See application file for complete search history.

(56) References Cited

U.S. PATENT DOCUMENTS 4,541,771 A * 9/1985 Beni .................... B25J 15/0266
                                                              414/730
4,730,861 A * 3/1988 Spencer ................. B25J 15/022
                                                               294/907

(Continued)

FOREIGN PATENT DOCUMENTS

CN        103990996 A     8/2014
CN        206382926 U     8/2017

(Continued)

OTHER PUBLICATIONS

EPO Machine Translation of JPH03245939A—"Tool Holder Gripper Device", Nov. 1 (Year: 1991).*

(Continued)

*Primary Examiner* — Erica E Cadugan
*Assistant Examiner* — Michael Vitale
(74) *Attorney, Agent, or Firm* — Fredrikson & Byron, P.A.

(57) ABSTRACT

A gripping device is provided in a turret-type tool magazine of a machine tool and grips a tool or a tool holder that holds the tool. The gripping device includes: a pair of arms configured to grip the tool or the tool holder by pinching the tool or the tool holder between the arms, a main body part configured to support the pair of arms so that each of the paired arms swings in the pinching directions to pinch the tool or the tool holder between the arms; and an angle detector configured to detect a physical quantity indicating a swing angle of the arm.

6 Claims, 15 Drawing Sheets

(56) References Cited

U.S. PATENT DOCUMENTS

| | | | |
|---|---|---|---|
| 4,878,705 A * | 11/1989 | Arnquist | B25J 15/103 |
| | | | 901/33 |
| 5,277,689 A * | 1/1994 | Ruetschle | B25J 15/0206 |
| | | | 483/902 |
| 5,674,170 A * | 10/1997 | Girardin | B23Q 3/15722 |
| | | | 211/1.55 |
| 6,428,070 B1 * | 8/2002 | Takanashi | B25B 5/16 |
| | | | 901/46 |
| 9,827,670 B1 * | 11/2017 | Strauss | B25J 9/0009 |
| 2013/0054027 A1 * | 2/2013 | Miyazaki | B25J 15/08 |
| | | | 700/258 |
| 2013/0200644 A1 * | 8/2013 | Shiomi | B25J 9/1612 |
| | | | 901/31 |
| 2014/0235414 A1 | 8/2014 | Muramatsu | |
| 2016/0067782 A1 | 3/2016 | Fujimoto et al. | |

FOREIGN PATENT DOCUMENTS

| | | | |
|---|---|---|---|
| JP | H03245939 | A | 11/1991 |
| JP | 4152043 | A | 5/1992 |
| JP | H05008483 | U | 2/1993 |
| JP | H06011988 | U | 2/1994 |
| JP | 2005271179 | A | 10/2005 |
| JP | 2007212470 | A | 8/2007 |
| JP | 2010160073 | A | 7/2010 |
| JP | 2013158888 | A | 8/2013 |
| JP | 2014159067 | A | 9/2014 |
| JP | 2014193494 | A | 10/2014 |
| JP | 2014193495 | A | 10/2014 |
| JP | 2015066614 | A | 4/2015 |
| JP | 201655371 | A | 4/2016 |

OTHER PUBLICATIONS

English Abstract and Machine Translation for Japanese Publication No. JPH03-245939A, published Nov. 1, 1991, 7 pgs.
English Abstract and Machine Translation for Japanese Publication No. JPH05-008483U, published Feb. 5, 1993, 10 pgs.
English Abstract and Machine Translation for Japanese Publication No. JP2007-212470A, published Aug. 23, 2007, 12 pgs.
English Abstract and Machine Translation for Japanese Publication No. JP2010-160073A, published Jul. 22, 2010, 42 pgs.
English Abstract and Machine Translation for Japanese Publication No. JP2013-158888A, published Aug. 19, 2013, 33 pgs.
English Machine Translation of Notification of Reasons for Refusal mailed by Japan Patent Office (JPO) for Application No. JP2018-216337, dated Oct. 27, 2020, 4 pages.
Untranslated Notification of Reasons for Refusal mailed by Japan Patent Office (JPO) for Application No. JP2018-216337, dated Oct. 27, 2020, 4 pages.
English Abstract for Japanese Publication No. 2016055371 A, published Apr. 21, 2016, 2 pgs.
English Abstract and Machine Translation for Japanese Publication No. 2014-193495 A, published Oct. 9, 2014, 10 pgs.
English Abstract and Machine Translation for Japanese Publication No. 04-152043 A, published May 26, 1992, 4 pgs.
English Abstract and Machine Translation for Japanese Publication No. JPH06-011988U, published Feb. 15, 1994, 14 pgs.
English Abstract and Machine Translation for Japanese Publication No. JP2005-271179A, published Oct. 6, 2005, 13 pgs.
English Abstract and Machine Translation for Chinese Publication No. CN103990996A, published Aug. 20, 2014, 5 pgs.
English Abstract and Machine Translation for Japanese Publication No. JP2014-193494A, published Oct. 9, 2014, 21 pgs.
English Abstract and Machine Translation for Japanese Publication No. JP2014159067A, published Sep. 4, 2014, 9 pgs.
English Abstract and Machine Translation for Japanese Publication No. JP2015-066614A, published Apr. 13, 2015, 26 pgs.
English Abstract and Machine Translation for Chinese Publication No. CN206382926U, published Aug. 8, 2017, 5 pgs.

* cited by examiner

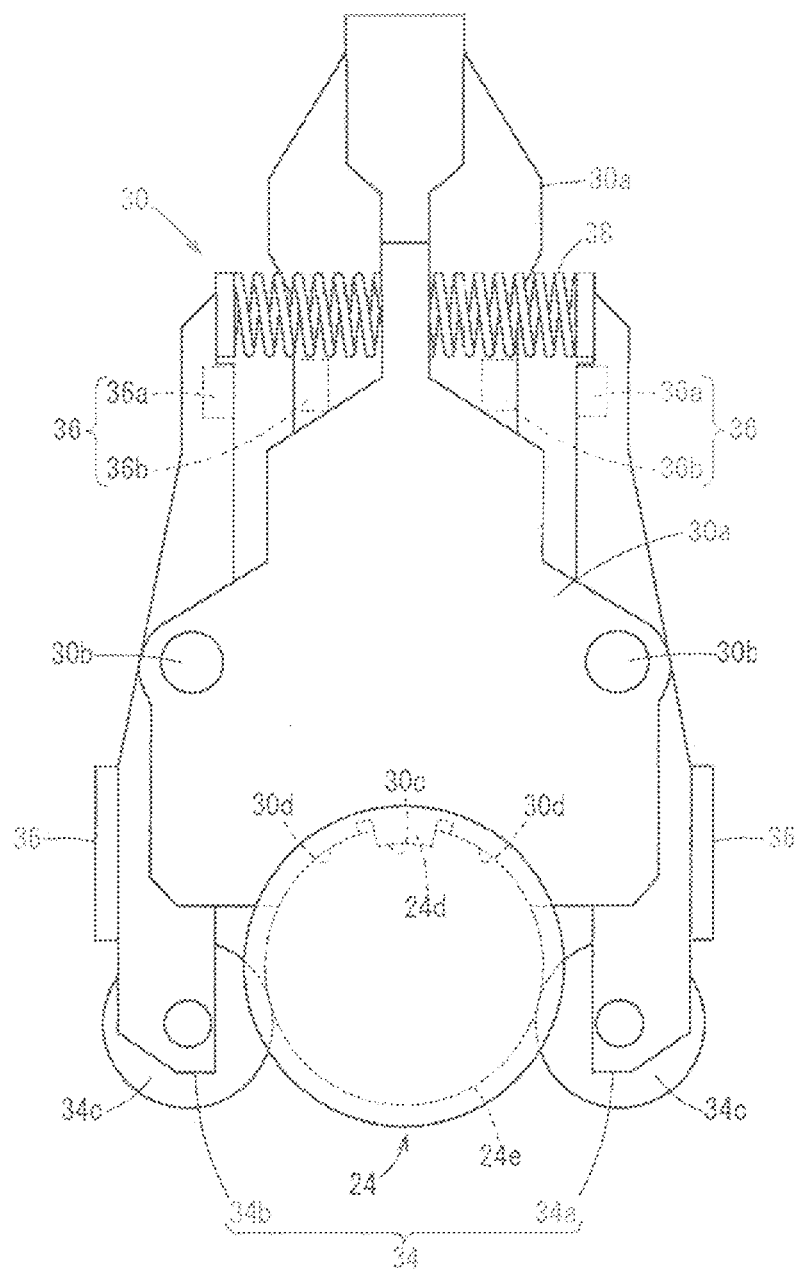

GRIPPING DEVICE AND SYSTEM

CROSS-REFERENCE TO RELATED APPLICATION

This application is based upon and claims the benefit of priority from Japanese Patent Application No. 2018-216337 filed on Nov. 19, 2018, the contents of which are incorporated herein by reference.

BACKGROUND OF THE INVENTION

Field of the Invention

The present invention relates to a gripping device provided in a turret-type tool magazine of a machine tool and a system including the gripping device.

Description of the Related Art

In a machine tool provided with a turret-type tool magazine as described in Japanese Laid-Open Patent Publication No. 2014-193495, the operator is required to attach tools to gripping devices in the turret-type tool magazine. For checking whether or not a tool is placed in the correct position at the time of attaching tools, there is no other way than a skilled worker checking it visually or by touch.

SUMMARY OF THE INVENTION

If a tool is not placed in the correct position, it may cause falling of the tool from the magazine, resulting in damage to the expensive tool or workpiece.

It is therefore an object of the present invention to provide a gripping device and a system capable of detecting whether or not a tool is placed in the correct position.

A first aspect of the present invention resides in a gripping device that is provided in a turret-type tool magazine of a machine tool and is configured to grip a tool or a tool holder that holds the tool, including: a pair of arms configured to grip the tool or the tool holder by pinching the tool or the tool holder between the arms; a main body part configured to support the pair of arms so that each of the paired arms swings in the pinching directions to pinch the tool or the tool holder between the arms; and an angle detector configured to detect a physical quantity indicating the swing angle of the arm.

A second aspect of the present invention resides in a system including: the above gripping device; and a determination device configured to determine whether or not the tool or the tool holder is placed in the correct position, based on the physical quantity.

According to the present invention, it is possible to detect whether or not the tool is placed in the correct position.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a view illustrating a configuration of a gripping device according to a modification example 3.

DESCRIPTION OF THE PREFERRED EMBODIMENTS

The gripping device and system according to the present invention will be detailed below by describing preferred embodiments with reference to the accompanying drawings.

Embodiment

Figure 1:
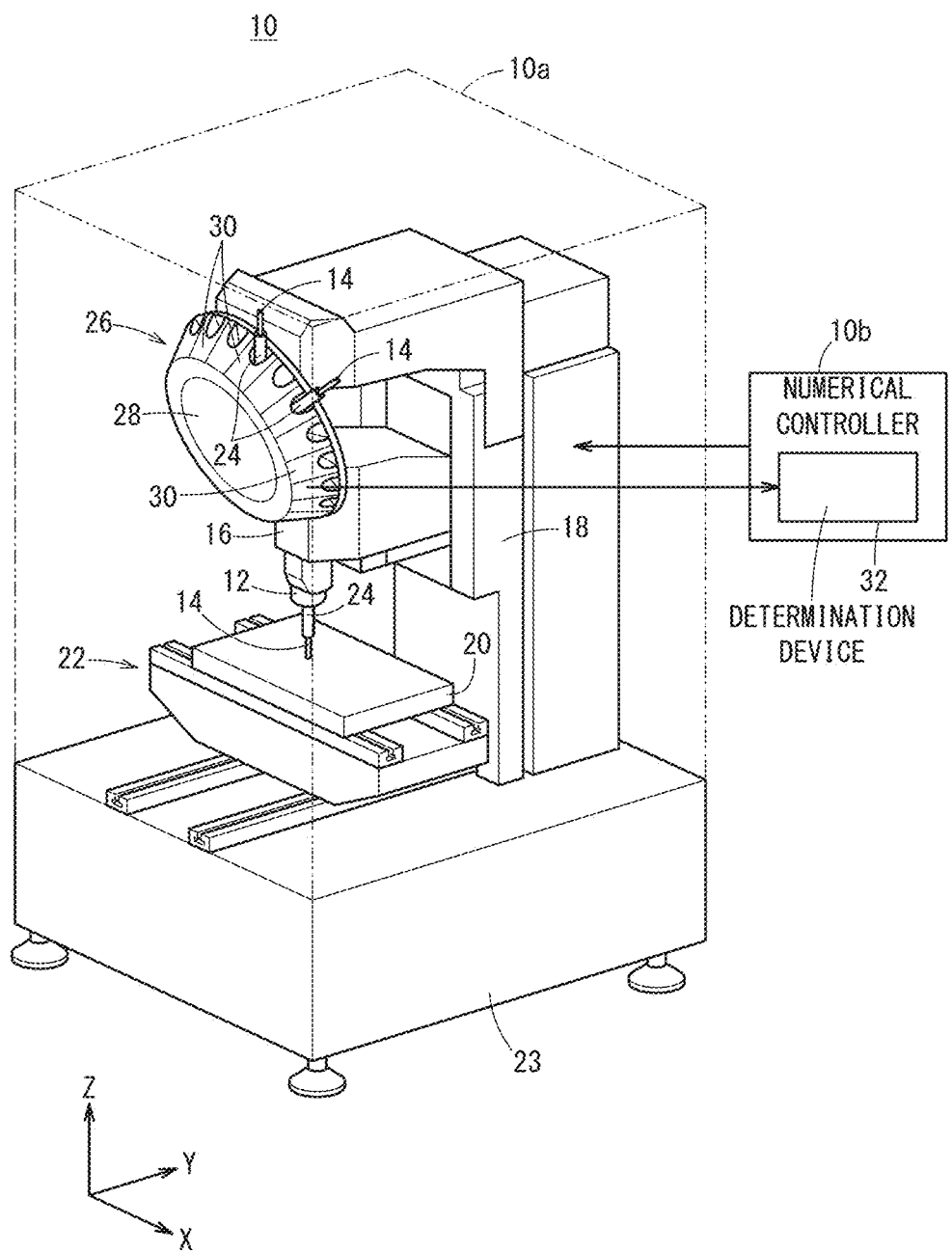
FIG. 1 is a view showing an external configuration of a system according to an embodiment.

FIG. 1 is a view showing an external configuration of a system 10 according to an embodiment. The system 10 is a machine tool including a machine tool body 10a and a numerical controller 10b. Hereinafter, the system 10 may also be referred to as a machine tool 10. The machine tool body 10a includes a spindle 12, a tool (cutting tool) 14, a spindle head 16, a column 18, a table 20 and a table drive unit 22. The tool (cutting tool) 14 is attached to the spindle unit 22. The spindle head 16 rotates the spindle 12 around a rotary axis parallel to the Z direction. The column 18 supports the spindle head 16 so as to be movable in the Z direction (vertical direction). The table 20 is disposed below the spindle 12, and fixes and supports an unillustrated workpiece (workpiece, an object to be machined). The table drive unit 22 supports the table 20 so as to be movable in the X direction and the Y direction with respect to a pedestal 23. It is assumed that the X direction, the Y direction and the Z direction are orthogonal to each other. The negative Z direction is the direction in which gravity acts.

In the machine tool 10, the numerical controller 10b drives and controls an X-axis motor, a Y-axis motor and a Z-axis motor (all not shown) so as to enable 3D-machining of a workpiece by changing the relative position between the tool 14 attached to the spindle 12 and the workpiece. The numerical controller 10b includes a determination device 32 that determines whether or not the tool 14 or the tool holder 24 is placed in the correct position on the gripping device 30, based on a physical quantity output from the gripping device 30.

The tool 14 is held by a tool holder 24. The tool holder 24 is attachable and detachable to and from the spindle 12, and the tool 14 is attached to the spindle 12 via the tool holder 24 and turns together with the spindle 12. The machine tool body 10a further includes an automatic tool changer 26, and is configured as a machining center that can exchange tools 14 to be attached to the spindle 12 by means of the automatic tool changer 26.

Figure 2:
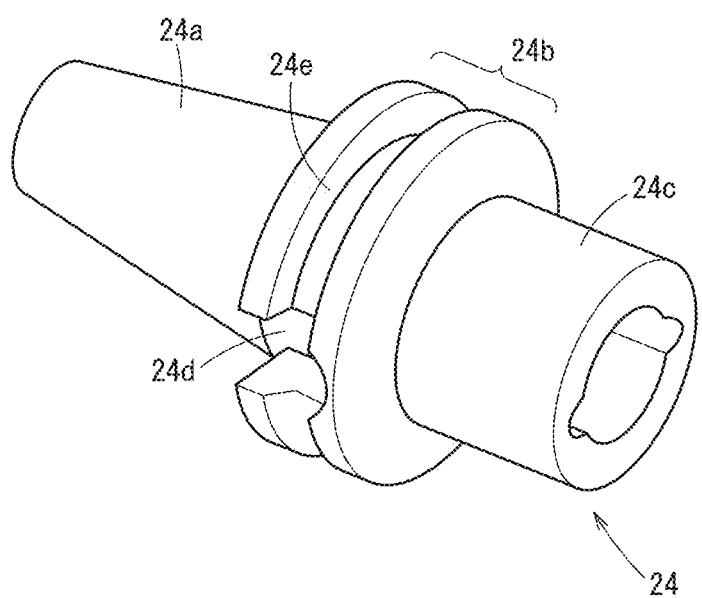
FIG. 2 is a perspective view showing a detailed configuration of a tool holder.

The automatic tool changer 26 includes a turret-type tool magazine 28 that can retain tool holders 24 holding tools 14. Examples of the tools 14 include non-rotation tools (hale tools), drills, end mills, milling cutters and the like. The turret-type tool magazine 28 is provided with a plurality of gripping devices 30 which can grip a plurality of tool holders 24. FIG. 2 is a perspective view showing a detailed configuration of the tool holder 24. The tool holder 24 has a configuration in which a first part 24a attached to the spindle 12, a second part 24b that is a portion gripped by the gripping device 30, and a third part 24c holding the tool 14 are integrally formed. The second part 24b has a first recess 24d and a second recess 24e into which the gripping device 30 is fitted. The second recess 24e is formed into an annular shape such that both ends thereof are in contact with the first recess 24d.

Figure 3:
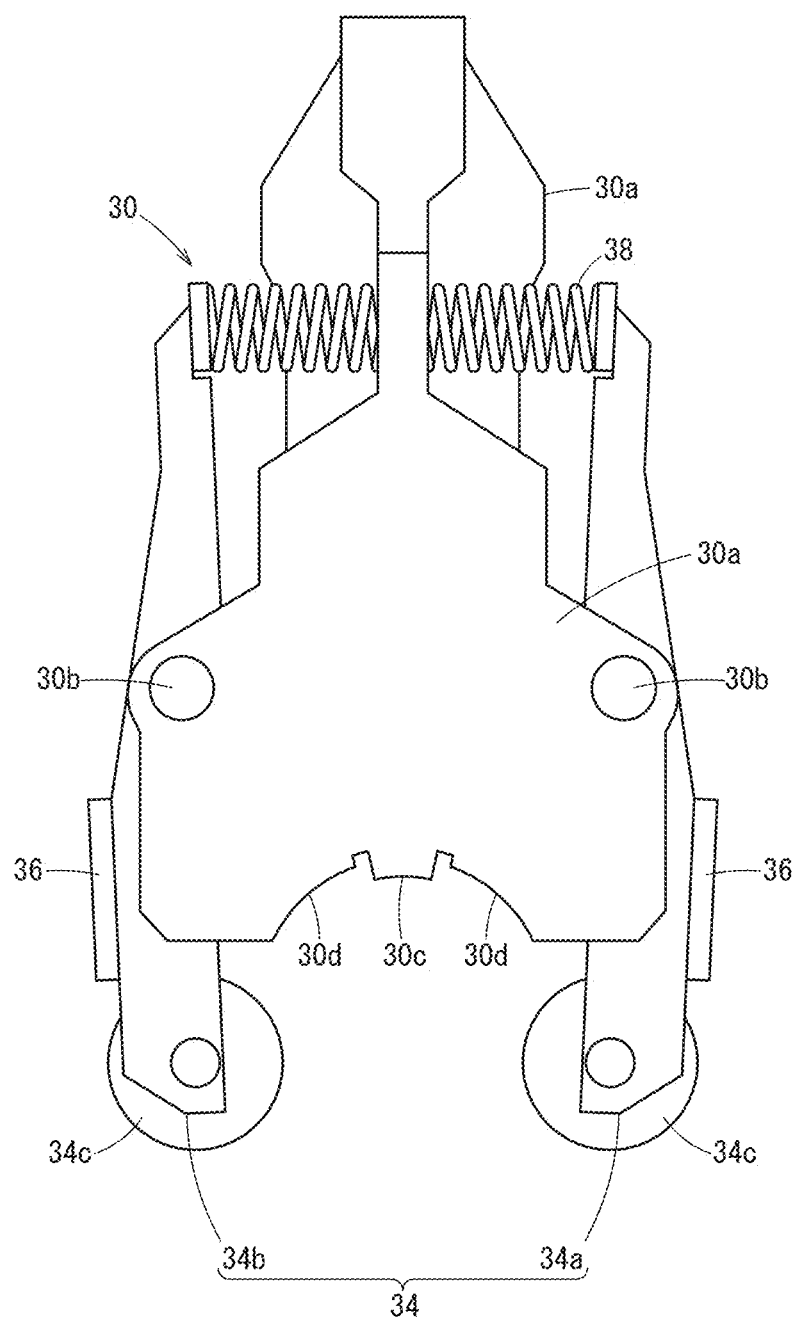
FIG. 3 is a view illustrating a gripping device when not gripping a tool holder.

FIG. 3 is a diagram showing the gripping device 30 when not gripping any tool holder 24. The gripping device 30 includes a pair of arms 34 (34a, 34b) for gripping the tool holder 24 by pinching the tool holder between the arms, and a main body part 30a that supports the pair of arms 34. The main body part 30a supports the pair of arms 34 at respective rotary axes 30b so that the pair of arms 34 can pivot (or swing around the respective rotary axes) in the pinching direction in order to grip the tool holder 24. A wheel-shaped roller 34c that can rotate freely is provided at the front end of each arm 34.

The main body part 30a has a first projection 30c and second projections 30d which are formed on a portion thereof that faces the tool holder 24 when the tool holder 24 is gripped. When the first projection 30c is fitted into the first recess 24d of the tool holder 24 and the second projections 30d and the rollers 34c are inserted into the second recess 24e of the tool holder 24, the gripping device 30 can fully grip the tool holder 24. This state is the state where the tool holder 24 is placed in the correct position.

The gripping device 30 further includes angle detectors 36 that detect a physical quantity indicating the pivot angle (swing angle) of each of the arms 34 (34a, 34b). The angle detectors 36 are provided for the respective arms 34 (34a, 34b) and each formed of a strain gauge sensor for measuring strain that depends on the pivot angle of each of the arms 34 (34a, 34b). That is, the physical quantity indicating the pivot angle of each of the arms 34 (34a, 34b) is the amount of strain. Note that the angle detector 36 may be installed on only one of the arms 34 (34a, 34b).

The gripping device 30 further includes an elastic body 38 arranged between each of the arms 34 and the main body part 30a so as to apply elastic force in directions which the tool holder 24 is pinched and gripped. A specific example of the elastic body 38 is a spring. Provision of the elastic bodies 38 enables the pair of arms 34 (34a, 34b) to produce a force required for gripping the tool holder 24. When no tool holder 24 is gripped, the arms 34 (34a, 34b) of the gripping device 30 are slightly closed toward the tool holder 24 to be inserted. In this state, the elastic bodies 38 are in their natural length.

Figure 4:
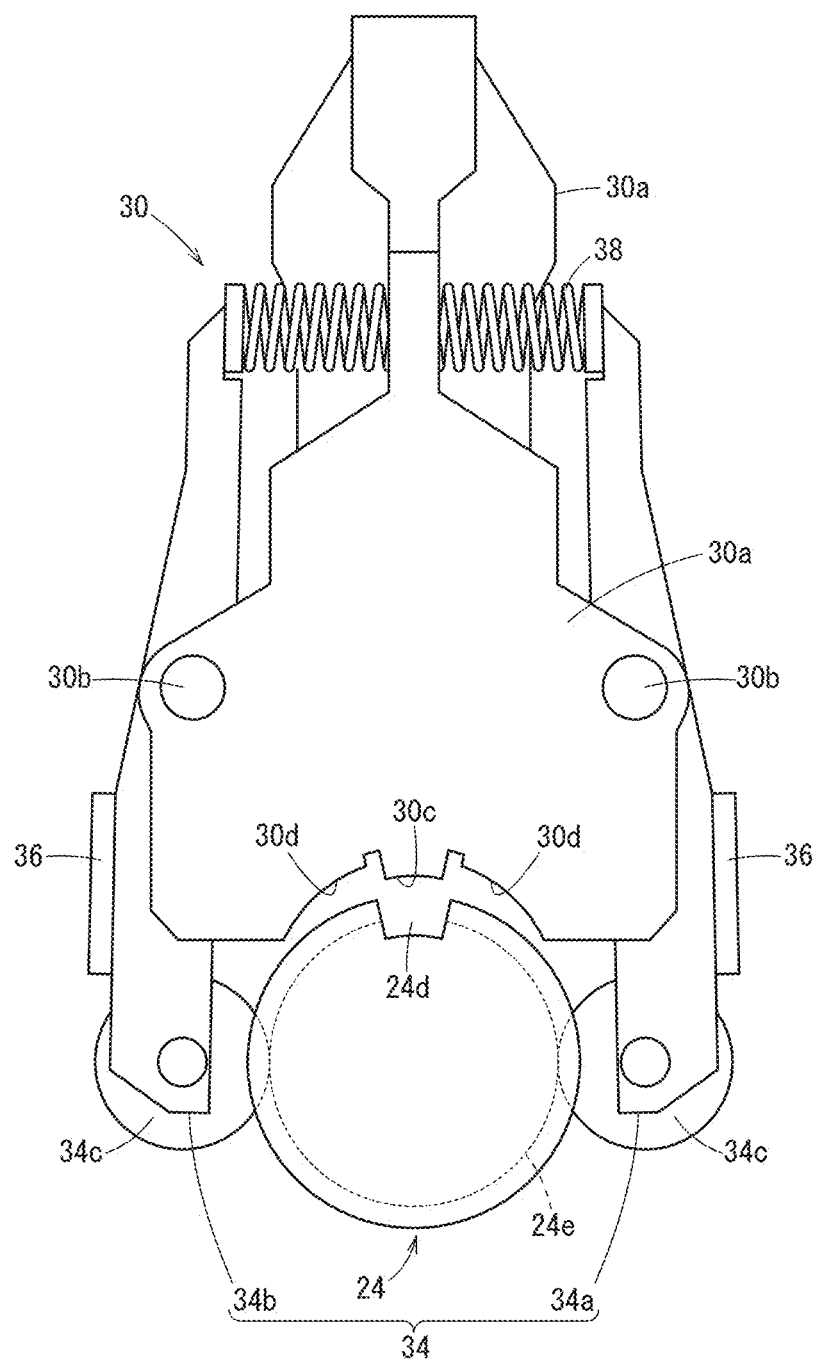
FIG. 4 is a view illustrating a gripping device on which a tool holder is being set.

When the tool holder 24 starts being inserted into between the arms 34 (34a, 34b) of the gripping device 30 in the state of FIG. 3, the arms 34 (34a, 34b) open against the elastic force from the elastic bodies 38 compressed from their natural length. At this time, the second recess 24e of the tool holder 24 is pressed by the rollers 34c. FIG. 4 is a diagram illustrating the gripping device 30 on which the tool holder 24 is being set. FIG. 4 shows a state where the arms 34 (34a, 34b) are opened to the maximum with their pivot angles having reached the maximum angles in the process of setting of the tool holder 24. That is, the drawing depicts the state where the arms 34 are moved apart from each other so that the distance between the rollers 34c of the arms 34a and 34b equals the diameter of the circumference defined by the bottom surface of the second recess 24e of the tool holder 24.

Figure 5:
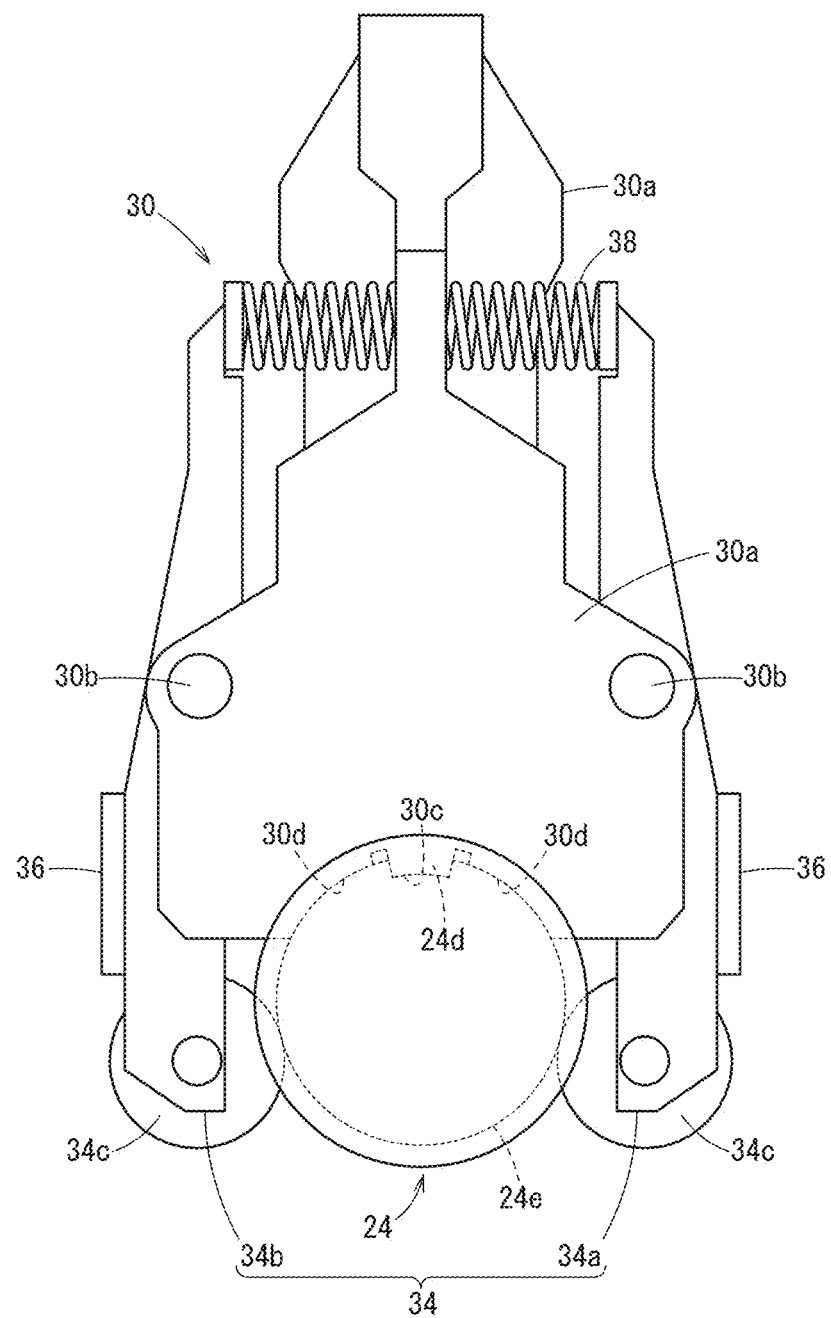
FIG. 5 is a view illustrating a gripping device when a tool holder has been set in the correct position.

As the tool holder 24 is further pushed toward the main body part 30a of the gripping device 30 from the state shown in FIG. 4, the tool holder 24 is placed into the correct position. FIG. 5 is a diagram showing the gripping device 30 when the tool holder 24 is placed in the correct position. In a state where the tool holder 24 is placed in the correct position, the first projection 30c of the main body part 30a is fitted into the first recess 24d of the tool holder 24, and the second projections 30d of the main body part 30a are in contact with the bottom surface of the second recess 24e of the tool holder 24. In this state where the tool holder 24 is placed in the correct position, the roller 34c of the arm 34a and the roller 34c of the arm 34b come into contact with the bottom surface of the second recess 24e of the tool holder 24, so that the tool holder 24 is securely held. In the state of FIG. 5, the arms 34 (34a, 34b) are positioned substantially parallel to each other.

As described above, the pivot angles of the arm 34 (34a, 34b) satisfies the following relationship:

(pivot angle in the state of FIG. 3)<(pivot angle in the state of FIG. 5)<(pivot angle in the state of FIG. 4).

As the pivot angle of each arm 34 becomes greater after start of insertion of the tool holder 24 between the arms 34 (34a, 34b), the arms 34 pressed by the elastic bodies 38 undergo the greater strain. As a result, the amount of strain detected by the angle detector 36 is expected to become greater. The determination device 32 stores in a storage unit a range of the amount of strain corresponding to the range of the pivot angle in which the tool holder 24 is considered to be placed in the correct position. Then, based on the physical quantity (amount of strain) detected at the time when the setting of the tool holder 24 on the gripping device 30 is completed, the determination device 32 can determine whether or not the tool holder 24 is placed in the correct position.

Note that each of the multiple gripping devices 30 may be configured to directly grip the tool 14. In this case, the tool 14 needs to be formed with the first recess 24d and the second recesses 24e.

Figure 6:
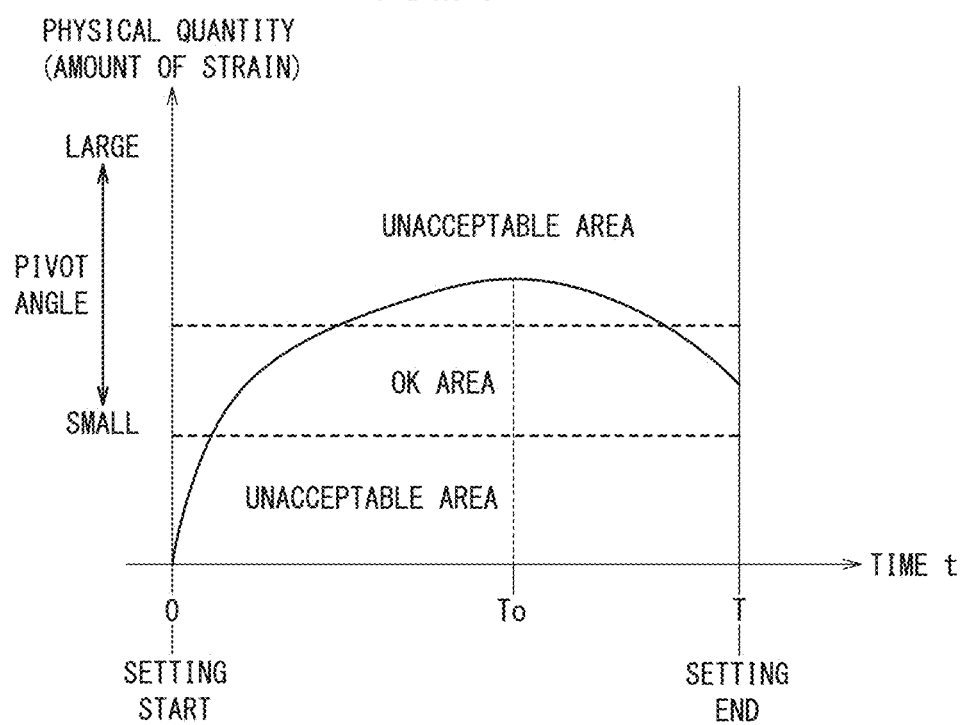
FIG. 6 is a graph showing variation in a physical quantity in a process where a tool or a tool holder is set on a gripping device.

FIG. 6 is a graph showing variation in a physical quantity in a process where the tool 14 or the tool holder 24 is set onto the gripping device 30. The vertical axis denotes the value of the physical quantity, and here, the physical quantity is the amount of strain. Herein, this graph is drawn such that the more upward the physical quantity goes in the vertical axis, the greater the pivot angle. The horizontal axis denotes time. The time at which the setting of the tool holder 24 onto the gripping device 30 is commenced in the state shown in FIG. 3 is defined as t=0. In the process of setting the tool holder 24, t=$T_0$ stands for the time at which the pair of arms 34 (34a, 34b) swing and spread to the maximum as in FIG. 4.

Finally, t=T stands for the time at which the setting is completed or when the tool holder 24 is placed into the correct position.

As described above, the determination device 32 stores in the storage unit the range of amount of strain corresponding to the range of pivot angle within which the tool holder 24 is considered to be placed in the correct position. In FIG. 6, the stored range is shown as an OK area (acceptable area), and the other part is shown as unacceptable areas. At time t=0 and time t=$T_0$, the amount of strain falls within the unacceptable area. After the time t=T when the setting to the gripping device 30 is completed, the amount of strain falls within the OK area. After the time t=0 when the setting is started, the amount of strain varies with time. Then, after the time t=T when the setting should be completed, if the tool holder 24 is gripped on a tilt so that the arms 34 are spread wider than in the correct position and the pivot angles increase, the amount of strain falls within the unacceptable area and is kept at a fixed value in the unacceptable area. In the case where the amount of strain is kept at a constant value in the unacceptable area for a predetermined period of time, the determination device 32 can determine that the tool holder 24 is not placed in the correct position. As shown in FIG. 6, by dividing the range of the physical quantity (amount of strain) into the unacceptable area and the OK area, the determination device 32 can determine whether or not the tool holder 24 is placed in the correct position, based on the physical quantity (amount of strain) detected by the angle detectors 36 after the end of the setting operation.

In this way, in the gripping device 30 with the arms 34 (34a, 34b), provision of the angle detectors 36 that detects the physical quantity indicating the pivot angle of the arm 34 (34a, 34b) makes it possible to easily detect whether or not the tool 14 or the tool holder 24 is placed in the correct position with respect to the arms 34 (34a, 34b).

When the determination device 32 determines that the tool 14 or the tool holder 24 is not placed in the correct position, the determination device 32 outputs an abnormality signal. In response to this, the numerical controller 10b can display an alarm guidance or the like indicating that the tool 14 or the tool holder 24 is not placed in the correct position, at an area on an unillustrated display screen that corresponds to the tool port number of the turret-type tool magazine 28 denoting the improperly-positioned tool holder. Owing thereto, even when an inexperienced operator sets the tool 14, the operator can easily check the setting of the tool 14. Further, when the determination device 32 determines that the tool 14 or the tool holder 24 is not placed in the correct position during processing, the numerical controller 10b can stop the processing. Therefore, it is possible to prevent the tool 14 from dropping when the tool 14 or the tool holder 24 is not placed in the correct position.

MODIFICATION EXAMPLES

The above embodiment may be modified as follows.

Modification Example 1

Figure 7:
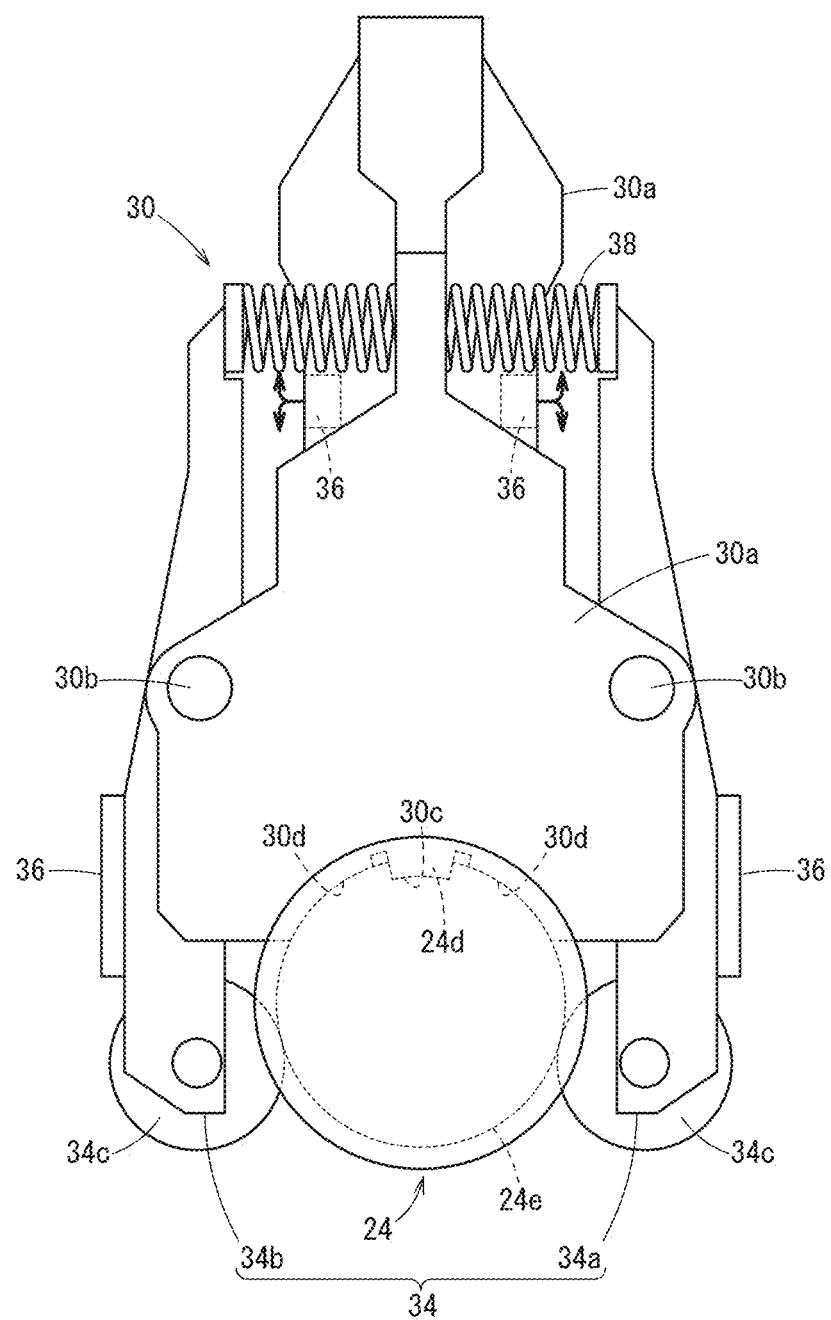
FIG. 7 is a view illustrating a configuration of a gripping device according to a modification example 1.
Figure 8:
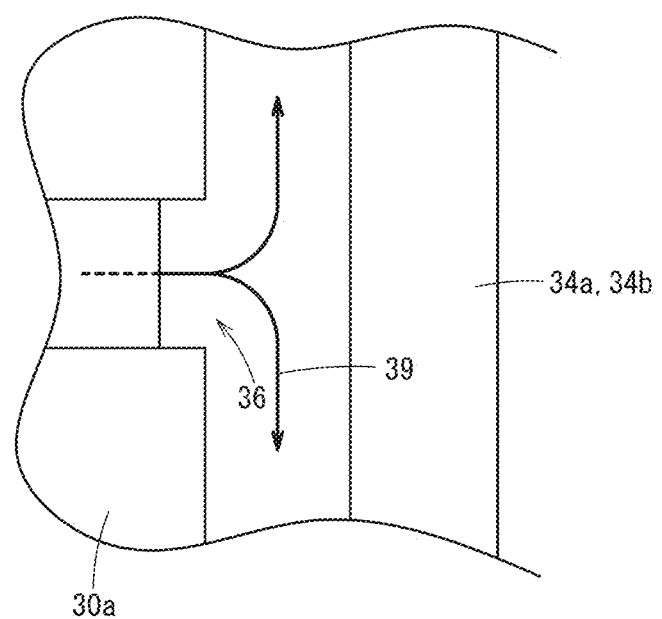
FIG. 8 is a view for explaining a state in which an air micro sensor is used as an angle detector.

FIG. 7 is a diagram illustrating a configuration of a gripping device 30 according to a modification example 1. The angle detector 36 in the gripping device 30 according to the modification example 1 is comprised of an air micro sensor (air gap sensor for precise machining). FIG. 8 is a diagram for explaining a state where the angle detector 36 is an air micro sensor. The air micro sensor provided as the angle detector 36 on a surface of the main body part 30a that faces the arm 34 blows air 39 against a side surface of the arm 34a or 34b and measures the amount of change in air pressure as a physical quantity. Since the air pressure depends on the distance between the main body part 30a and the arm 34a or 34b, the amount of change in air pressure corresponds to the change of the distance, that is, the pivot angle. The determination device 32 can determine whether or not the tool 14 or the tool holder 24 is placed in the correct position, based on the change in air pressure detected by the angle detector 36.

Modification Example 2

Figure 9:
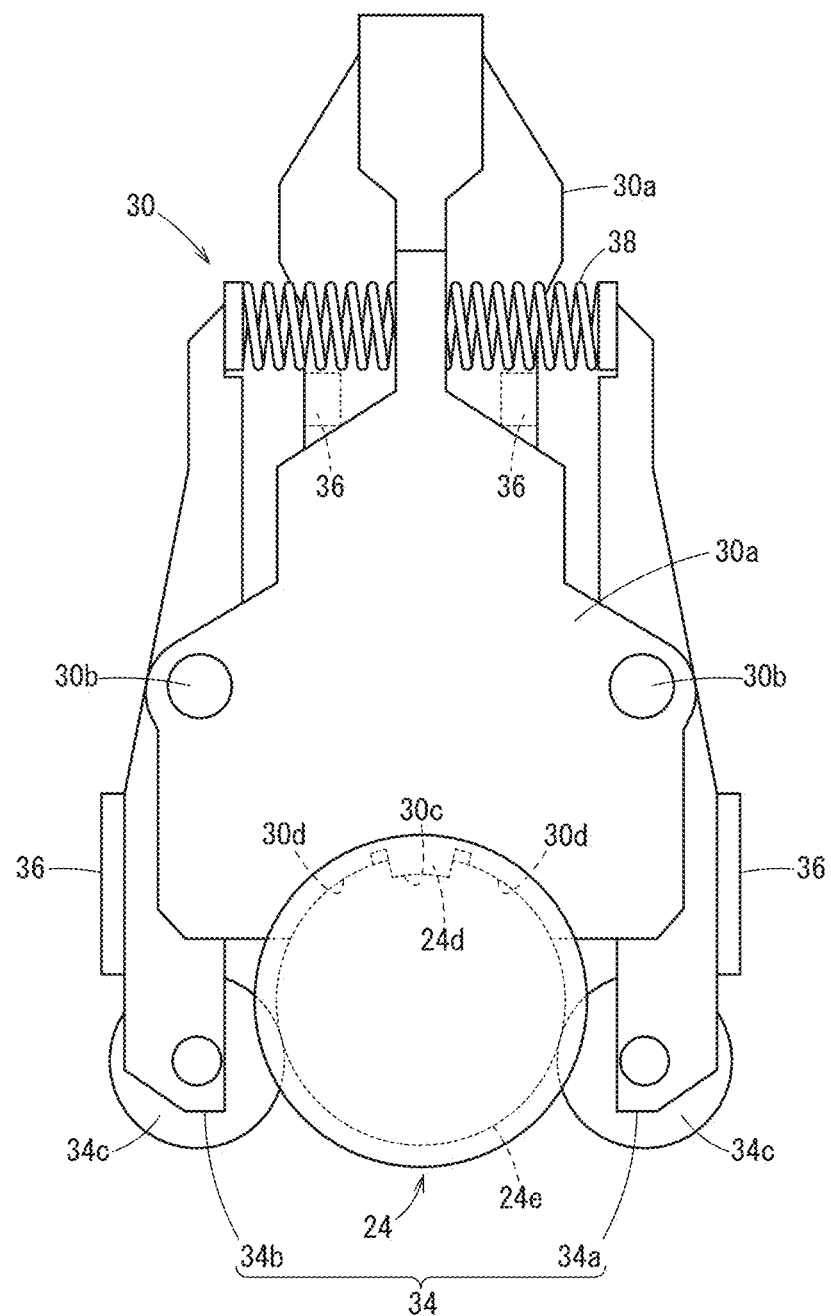
FIG. 9 is a view illustrating a configuration of a gripping device according to a modification example 2.

FIG. 9 is a diagram illustrating a configuration of a gripping device 30 according to a modification example 2. The angle detector 36 in the gripping device 30 according to the modification example 2 is comprised of a capacitance sensor. The capacitance sensor provided as the angle detector 36 on a surface of the main body part 30a that faces the arm 34 detects the distance to the metal-made opposing arm 34a or 34b by measuring capacitance. That is, the angle detector 36 measures the capacitance between the angle detector 36 (capacitance sensor) and the arm 34 as a physical quantity indicating the pivot angle of the arm 34. In this case, portions of the main body part 30a that are located around the angle detector 36 are formed of nonmetals such as ceramic material. The determination device 32 can determine whether or not the tool 14 or the tool holder 24 is placed in the correct position, based on the electrostatic capacitance detected by the angle detectors 36.

Modification Example 3

Figure 10:
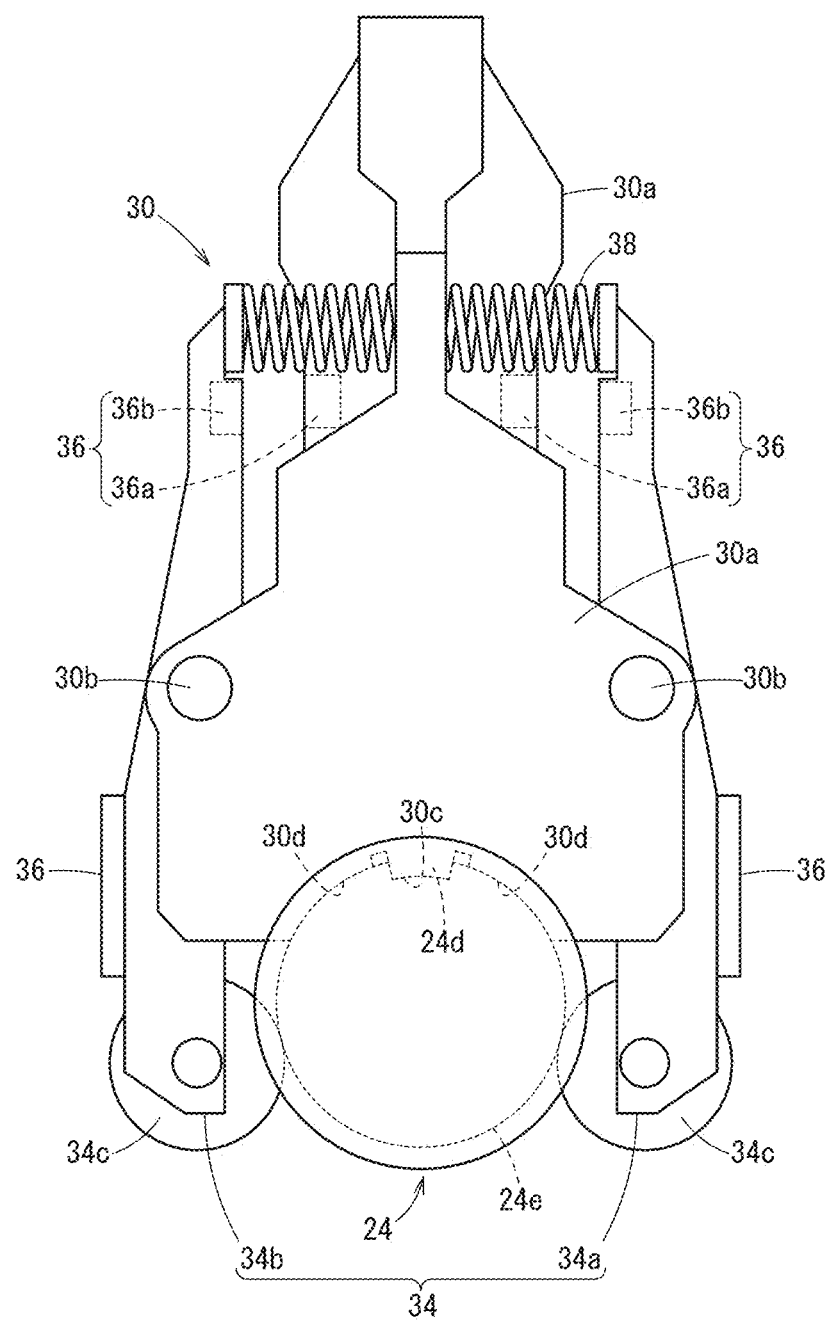
FIG. 10 is a view illustrating a configuration of a gripping device according to a modification example 3.

FIG. 10 is a diagram illustrating a configuration of a gripping device 30 according to a modification example 3. The angle detector 36 in the gripping device 30 according to the modification example 3 includes a Hall element 36a and a magnet 36b. The Hall element 36a is installed on a surface of the main body part 30a that faces the arm 34, and the magnet 36b is disposed on a surface of the arm 34a or 34b that faces the main body part 30a. The arrangement of the Hall element 36a and the magnet 36b may be reversed. In this configuration of the angle detector 36, the Hall element 36a detects the strength of the magnetic field depending on the distance between the main body part 30a and the arm 34a or 34b as a Hall current. That is, the Hall current depends on the distance, and hence represents the physical quantity indicating the pivot angle. Therefore, the determination device 32 can determine whether or not the tool 14 or the tool holder 24 is placed in the correct position based on the Hall current detected by the Hall elements 36a of the angle detectors 36.

Modification Example 4

Figure 11:
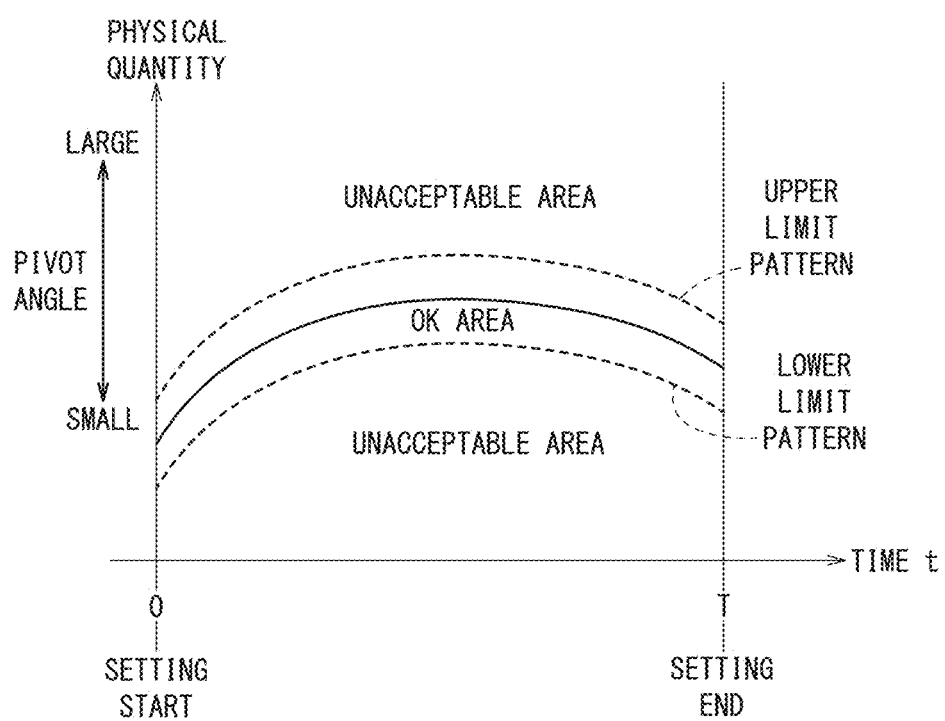
FIG. 11 is a graph of time variation in a physical quantity in a process where the tool or tool holder is set on a gripping device according to a modification example 4.

FIG. 11 is a graph of time variation in a physical quantity when the tool 14 or the tool holder 24 is set onto the gripping device 30 in a modification example 4. The vertical axis denotes the value of the physical quantity. The physical quantity is not limited as long as it is a physical quantity that indicates the pivot angle of the arm 34, such as amount of strain, air pressure, capacitance, and Hall current. Herein, this graph is drawn such that the more upward the physical quantity goes in the vertical axis, the greater the pivot angle becomes. The horizontal axis denotes time. The time at which the setting of the tool 14 or the tool holder 24 onto the gripping device 30 is started is defined as t=0. Time t=T stands for the time at which the setting ends. In the modification example 4, an OK area in which the determination device 32 determines that the tool 14 or the tool holder 24 is placed in the correct position, and unacceptable areas in which the determination device 32 determines that the tool 14 or the tool holder 24 is placed out of the correct position, are defined correspondingly to the pattern of the time variation in the physical quantity.

That is, the determination device 32 stores the range of the OK area for each point of time from the setting start time t=0 to the setting end time t=T. The determination device 32 determines that the tool 14 or the tool holder 24 is placed in the correct position only when the time variation of the physical quantity falls within the OK area constantly from the setting start time t=0 to the setting end time t=T. Even before the setting end time t=T, the determination device 32 may determine that the tool 14 or the tool holder 24 is not placed in the correct position when the value of the physical quantity falls within the unacceptable area.

This enables the determination device 32 to determine with higher accuracy whether or not the tool 14 or the tool holder 24 is placed in the correct position, based on the time variation of the physical quantity detected by the angle detector 36.

Modification Example 5

Figure 12:
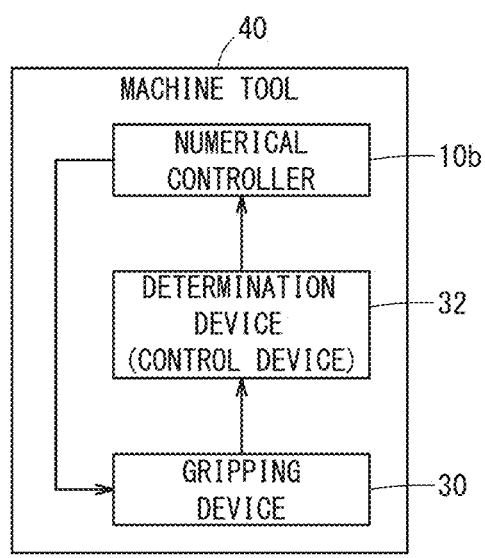
FIG. 12 is a view illustrating a configuration of a system according to a modification example 5.

FIG. 12 is a diagram illustrating a configuration of a system 40 according to a modification example 5. The system is a machine tool, and will be referred to as the machine tool 40 hereinbelow. The machine tool 40 has the same configuration as the machine tool 10 of FIG. 1. However, in the machine tool 40, the determination device 32 is a control device different from the numerical controller 10b. The control device such as a personal computer or a microcomputer that is different from the numerical controller 10b is provided with the function of the determination device 32, so that the setting of the tool 14 can be easily checked without considerably changing the configuration of the numerical controller 10b.

Modification Example 6

Figure 13:
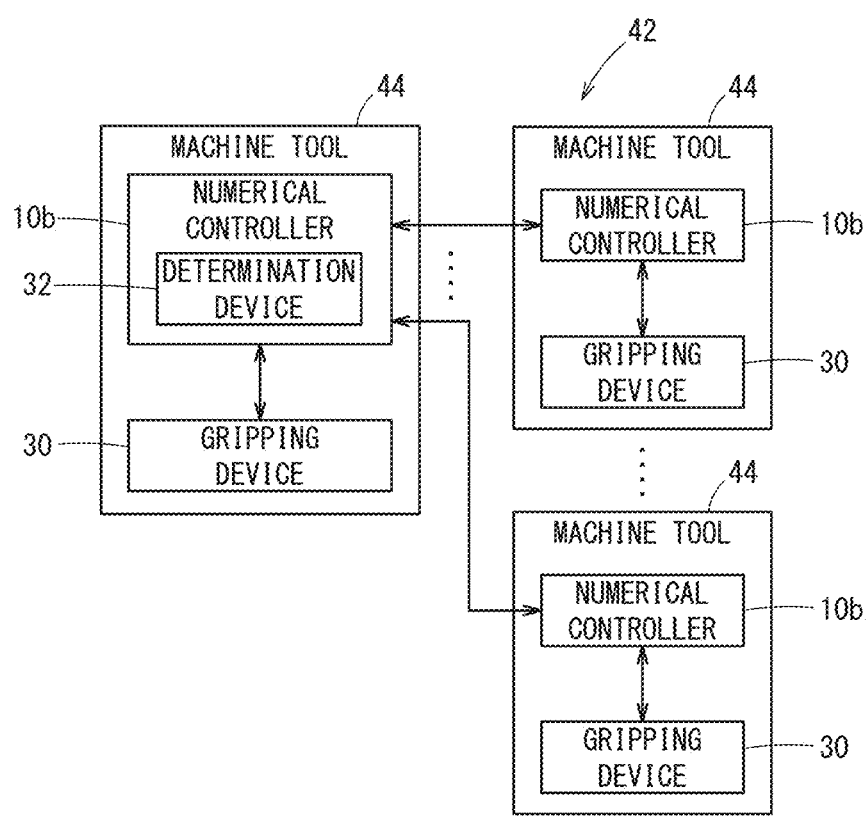
FIG. 13 is a view illustrating a configuration of a system according to a modification example 6.

FIG. 13 is a diagram illustrating a configuration of a system 42 according to a modification example 6. The system 42 is a machine tool system including a plurality of machine tools 44 each provided with the numerical controller 10b. In this modification example, the numerical controller 10b of only one of the multiple machine tools 44 includes the determination device 32.

In the modification example 6, the determination device 32 determines whether or not the tool 14 or the tool holder 24 is placed in the correct position for each of the machine tools 44, based on the physical quantity acquired by the angle detectors 36 of each of the gripping devices 30 of the multiple machine tools 44. In this way, even if the number of machine tools constituting the system 42 increases, the determination device 32 provided in one numerical controller 10b can determine whether or not the tool 14 or the tool holder 24 is placed in the correct position for each of the gripping devices 30 of all the machine tools 44. With this configuration, even in the machine tool system having a plurality of machine tools 44, it is possible to easily check the setting of tools 14.

Modification Example 7

Figure 14:
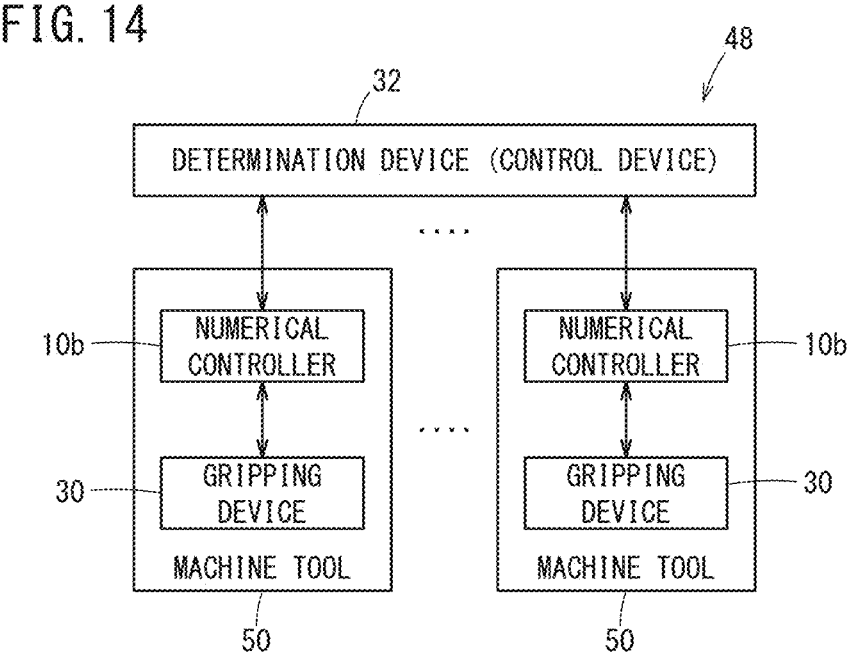
FIG. 14 is a view illustrating a configuration of a system according to a modification example 7.

FIG. 14 is a diagram showing a configuration of a system 48 according to a modification example 7. The system 48 is a machine tool system including a determination device 32 (control device) and a plurality of machine tools 50 each having a numerical controller 10b. The determination device 32 is a control device configured by a personal computer or a microcomputer different from the numerical controller 10b.

In the modified example 7, the determination device 32 determines whether or not the tool 14 or the tool holder 24 is placed in the correct position for each of the machine tools 50, based on the physical quantity acquired by the angle detectors 36 of each of the gripping devices 30 of the multiple machine tools 50. In this way, even if the number of machine tools 50 constituting the system 48 increases, the determination device 32 can determine whether or not the tool 14 or the tool holder 24 is placed in the correct position for each of the gripping devices 30 of all the machine tools 50. With this configuration, even in the machine tool system having a plurality of machine tools 50, it is possible to easily check the setting of tools 14 without significant change of the configuration of the numerical controller 10b.

Invention Obtained from the Embodiment

The invention that can be grasped from the above embodiment will be described below.

First Invention

The gripping device (30) is provided in a turret-type tool magazine (28) of a machine tool (10, 40, 44, 50) and is configured to grip a tool (14) or a tool holder (24) that holds the tool (14). The gripping device (30) includes: a pair of arms (34a, 34b) configured to grip the tool (14) or the tool holder (24) by pinching the tool or the tool holder between the arms; a main body part (30a) configured to support the pair of arms (34a, 34b) so that each of the paired arms (34a, 34b) swings in the pinching directions to pinch the tool (14) or the tool holder (24) between the arms (34a, 34b); and an angle detector (36) configured to detect a physical quantity indicating the swing angle of the arm (34).

Thus, this configuration makes it possible to easily detect whether or not the tool (14) or the tool holder (24) is placed in the correct position on the arms (34a, 34b). Therefore, in this configuration, if a numerical controller (10b) is adapted to give a warning such as displaying on a display screen the condition of the tool (14) or the tool holder (24) not being placed in the correct position, this enables easy check of the setting of the tool (14). As a result, the tool (14) can be prevented from dropping when the tool (14) or the tool holder (24) is not placed in the correct position.

The angle detector (36) may be comprised of a strain gauge sensor that is arranged on the arm (34a, 34b) and configured to measure the amount of strain of the arm (34a, 34b).

The angle detector (36) may be comprised of a sensor that detects the distance between the arm (34a, 34b) and the main body part (30a).

The angle detector (36) may be comprised of an air micro sensor or a capacitance sensor.

The angle detector (36) may include a magnet (36b) arranged on one of the arm (34a, 34b) and the main body part (30a), and a Hall element (36a) arranged on the other one of the arm (34a, 34b) and the main body part (30a) and configured to detect the strength of the magnetic field.

An elastic body (38) configured to apply an elastic force in a direction in which the tool (14) or the tool holder (24) is pinched is provided between each arm (34a, 34b) and the main body part (30a). This enables the pair of arms (34a, 34b) to have a gripping force for gripping the tool (14) or the tool holder (24).

Second Invention

The system (10, 40, 42, 48) includes the aforementioned gripping device (30) and a determination device (32) configured to determine whether or not the tool (14) or the tool holder (24) is placed in the correct position, based on the physical quantity.

Thus, this configuration makes it possible to easily detect and determine whether or not the tool (14) or the tool holder (24) is placed in the correct position on the arms (34a, 34b). Therefore, in this configuration, if a numerical controller (10b) is adapted to give a warning such as displaying on a display screen the condition of the tool (14) or the tool holder (24) not being placed in the correct position, this enables easy check of the setting of the tool (14). As a result, the tool (14) can be prevented from dropping when the tool (14) or the tool holder (24) is not placed in the correct position.

The determination device (32) may be configured to determine whether or not the tool (14) or the tool holder (24) is placed in the correct position, based on the time variation of the physical quantity. This makes it possible to achieve further accurate determination.

The system (10, 40) may be a machine tool (10, 40) having the gripping device (30).

The determination device (32) may be incorporated in a numerical controller (10b) of the machine tool (10).

The determination device (32) may be a control device different from a numerical controller (10b) of the machine tool (40). This enables easy check of the setting of the tool (14) without significantly changing the configuration of the numerical controller (10b).

The system (42) may include a plurality of the machine tools (44), and the determination device (32) may be incorporated in one of numerical controllers (10b) of the multiple machine tools (44). This enables easy check of the setting of the tool (14) even in the machine tool system having multiple machine tools (44).

The system (48) may include a plurality of the machine tools (50), and the determination device (32) may be a control device that is different from numerical controllers (10b) of the multiple machine tools (50). This enables easy check of the setting of the tool (14) without significantly changing the configuration of the numerical controller (10b) even in the machine tool system having multiple machine tools (50).

The present invention is not particularly limited to the embodiment described above, and various modifications are possible without departing from the essence and gist of the present invention.

What is claimed is:

1. A system, comprising:
    a gripping device that is provided in a turret-type tool magazine of a first machine tool and is configured to grip a tool or a tool holder that holds the tool, and
    means for determining whether or not the tool or the tool holder is placed in a correct position, based on time variation of a physical quantity from a start time to an end time, wherein
    the gripping device includes:
        a pair of arms configured to grip the tool or the tool holder by pinching the tool or the tool holder between the pair of arms;
        a main body part configured to support the pair of arms so that each of the pair of arms pivots about a respective axis in pinching directions to pinch the tool or the tool holder between the pair of arms; and
        an angle detector configured to detect the physical quantity, where the physical quantity represents a respective pivot angle of one of the pair of arms, wherein
        the angle detector includes a magnet that is arranged on one of the main body part and the one of the pair of arms, and a Hall element that is arranged on the other of the main body part and the one of the pair of arms, and where the Hall element is configured to detect a strength of a magnetic field.

2. The system according to claim 1, wherein an elastic body configured to apply an elastic force in a direction in which the tool or the tool holder is pinched is provided between the pair of arms.

3. The system according to claim 1, wherein the means for determining whether or not the tool or the tool holder is placed in the correct position is a control device.

4. The system according to claim 3, wherein the control device is separate from a numerical controller of the first machine tool.

5. The system according to claim 1, wherein
    the system comprises a plurality of machine tools including the first machine tool, and
    the means for determining whether or not the tool or the tool holder is placed in the correct position is incorporated in a numerical controller of the first machine tool of the plurality of machine tools.

6. The system according to claim 1, wherein
    the system comprises a plurality of machine tools including the first machine tool, and
    the means for determining whether or not the tool holder is placed in the correct position is a control device that is separate from numerical controllers of the plurality of machine tools.

* * * * *